(12) United States Patent
Hallman et al.

(10) Patent No.: US 11,799,394 B2
(45) Date of Patent: Oct. 24, 2023

(54) INVERTER PHASE SWITCH WITH HIGH SIDE VS LOW SIDE MOSFET RESISTANCE DIVERSITY

(71) Applicant: Steering Solutions IP Holding Corporation, Saginaw, MI (US)

(72) Inventors: Michael C. Hallman, Birch Run, MI (US); Wayne A. Burns, Millington, MI (US); Jeffrey M. Otto, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/585,071

(22) Filed: Jan. 26, 2022

(65) Prior Publication Data

US 2022/0255460 A1 Aug. 11, 2022

Related U.S. Application Data

(60) Provisional application No. 63/147,361, filed on Feb. 9, 2021.

(51) Int. Cl.
*H02M 7/5395* (2006.01)
*B62D 5/04* (2006.01)
*H02P 27/08* (2006.01)

(52) U.S. Cl.
CPC ............ *H02M 7/5395* (2013.01); *B62D 5/04* (2013.01); *H02P 27/08* (2013.01)

(58) Field of Classification Search
None
See application file for complete search history.

(56) References Cited

U.S. PATENT DOCUMENTS 8,890,459 B2 * 11/2014 Sakai .................... B62D 5/0481
318/599
2010/0165811 A1 * 7/2010 Bonvin ................ G11B 19/047

* cited by examiner

*Primary Examiner* — Said Bouziane
(74) *Attorney, Agent, or Firm* — Dickinson Wright PLLC (57) ABSTRACT

One or more embodiments are provided for an inverter. The inverter includes a phase switch configured to supply AC power via an output terminal. The phase switch includes a high-side leg and a low-side leg. The high-side leg includes a high-side solid-state switch configured to selectively conduct current between a high-side conductor of a DC bus and the output terminal, and the low-side leg includes a low-side solid-state switch configured to selectively conduct current between the output terminal and a low-side conductor of the DC bus. The high-side solid-state switch has a first conducting-state resistance value, and the low-side solid-state switch has a second conducting-state resistance value different than the first conducting-state resistance value. A shunt resistor may be connected in series with a corresponding one of the high-side solid-state switch or the low-side solid-state switch, balancing the resistances of the high-side leg and the low-side leg.

20 Claims, 3 Drawing Sheets

INVERTER PHASE SWITCH WITH HIGH SIDE VS LOW SIDE MOSFET RESISTANCE DIVERSITY

CROSS-REFERENCES TO RELATED APPLICATIONS

This patent application claims priority to U.S. Provisional Patent Application Ser. No. 63/147,361, filed Feb. 9, 2021, which is incorporated herein by reference in its entirety.

TECHNICAL FIELD

This disclosure relates to motor drives for converting direct current (DC) electrical power to alternating current (AC) electrical power. More specifically, the present disclosure relates to such inverters for use in motor drive circuits.

BACKGROUND

Electric motor drives, also known as variable frequency drives (VFDs) are used in a variety of applications to provide alternating current (AC) electrical power to an electric motor. Electric motor drives are frequently used in electric vehicles for powering traction motors at a range of different speeds. Electric motor drives also have industrial and commercial applications such as running blowers, conveyors, and/or other machines at a range of different speeds.

Electric motor drives may include one or more solid-state switches, such as metal-oxide-semiconductor field-effect transistors (MOSFETs), to switch a DC source in order to generate AC power. In typical inverters, the solid-state switches are typically of a similar type and/or include identical characteristics.

SUMMARY

This disclosure relates generally to motor drives. More specifically, this disclosure relates to an arrangement of solid-state switches in a phase switch of an inverter within a motor drive.

An aspect of the disclosed embodiments includes an inverter. The inverter includes a phase switch configured to supply AC power via an output terminal. The phase switch includes a high-side leg and a low-side leg, the high-side leg including a high-side solid-state switch configured to selectively conduct current between a high-side conductor of a DC bus and the output terminal, and the low-side leg including a low-side solid-state switch configured to selectively conduct current between the output terminal and a low-side conductor of the DC bus. The high-side solid-state switch has a first conducting-state resistance value, and the low-side solid-state switch has a second conducting-state resistance value different than the first conducting-state resistance value.

An aspect of the disclosed embodiments includes a motor drive. The motor drive includes an inverter including a plurality of phase switches. Each of the phase switches is configured to supply AC power to an electric motor via a corresponding output terminal. Each of the phase switches includes: a high-side leg and a low-side leg, the high-side leg including a high-side solid-state switch configured to selectively conduct current between a high-side conductor of a DC bus and the corresponding output terminal, and the low-side leg including a low-side solid-state switch configured to selectively conduct current between the corresponding output terminal and a low-side conductor of the DC bus. The high-side solid-state switch has a first conducting-state resistance value, and the low-side solid-state switch has a second conducting-state resistance value different than the first conducting-state resistance value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically includes one or more electric machines, such as electric motors and the like. For example, the vehicle may include one or more multiphase electric machines configured to control various aspects of a steering system of the vehicle.

Figure 1:
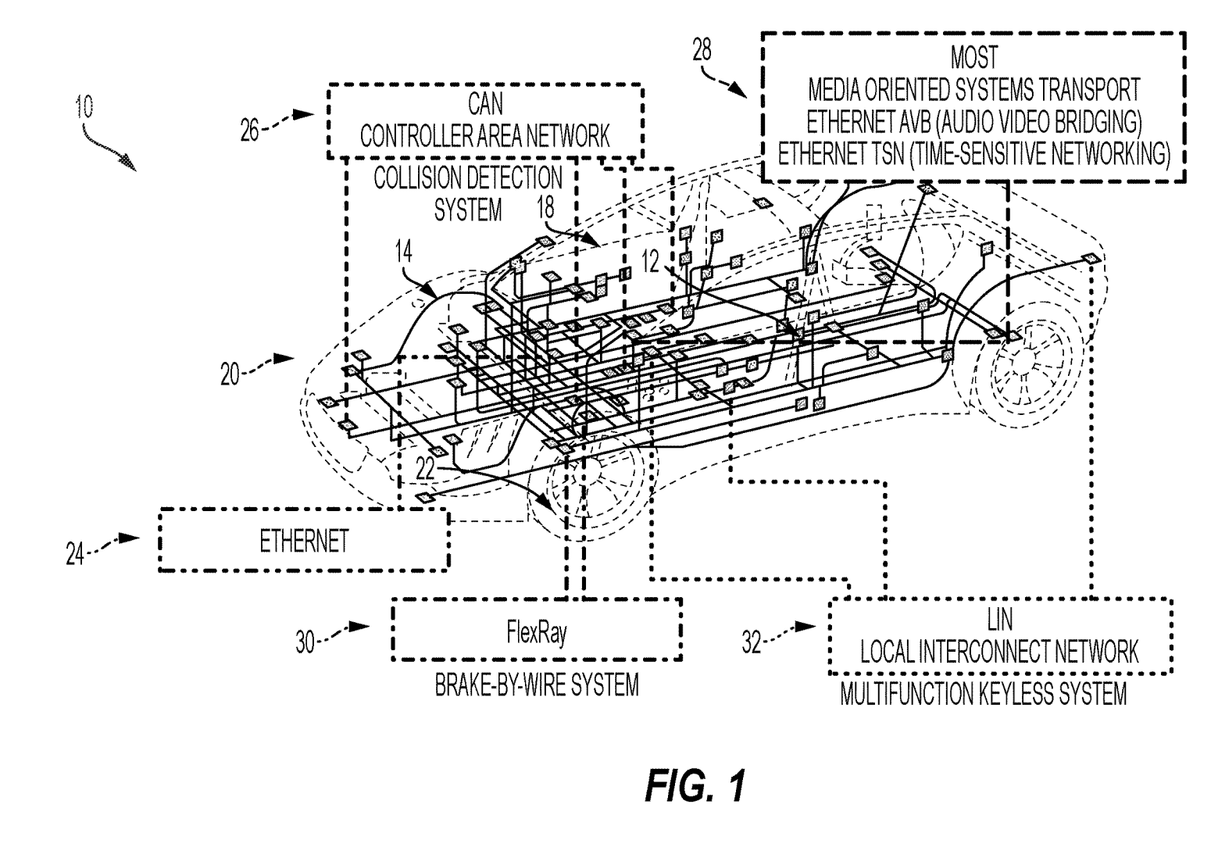
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Many traditional motor control strategies used for controlling an AC motor, such as a three-phase brushless motor, include precise monitoring and control of the current in each of the phases. To generate this current, an inverter uses solid-state switches, such as metal-oxide-semiconductor field-effect transistors (MOSFETs) to attempt to generate a specific voltage waveform across the terminals of the motor.

Figure 2:
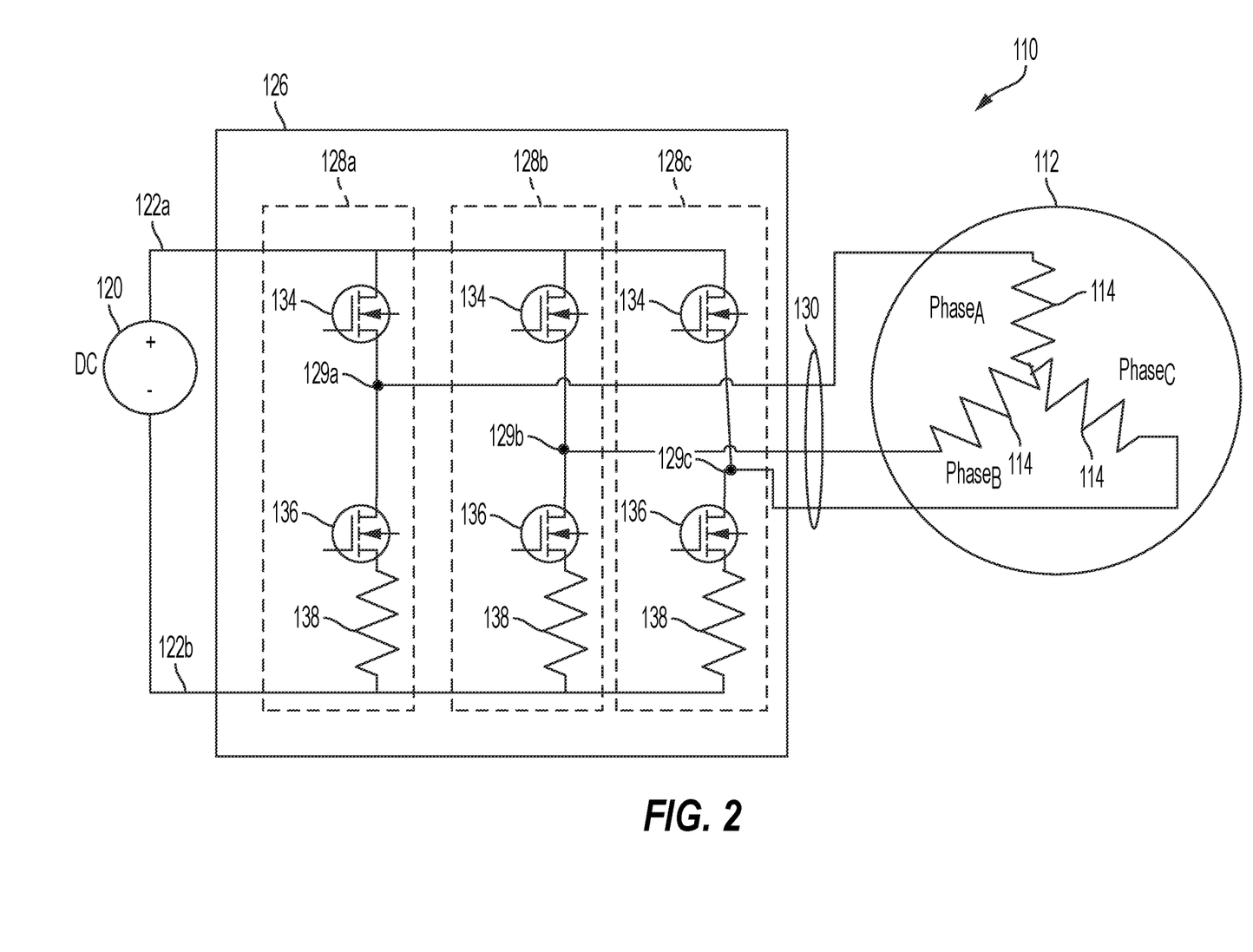
FIG. 2 generally illustrates a schematic diagram of a motor drive according to the principles of the present disclosure.

FIG. 2 illustrates a schematic diagram of a motor drive 110 according to the principles of the present disclosure. The motor drive 110 is a three-phase drive, configured to supply AC current to a three-phase motor 112. The three-phase motor 112 may be a brushless permanent motor, such as a permanent magnet synchronous machine (PMSM), although the three-phase motor 112 may be another type of motor or motor/generator, such as an induction motor or a wound field machine. The three-phase motor 112 is shown with three motor windings 114, also called $Phase_A$, $Phase_B$, $Phase_C$, respectively, connected in a Wye configuration, with a common center node. The three-phase motor 112 may have any number of windings, which may be connected in other configurations, such as a delta configuration.

The motor drive 110 includes a battery as a direct current (DC) source 120 to supply a DC electrical power upon a DC bus 122a, 122b including a high-side conductor 122a and a low-side conductor 122b, with the high-side conductor 122a having a higher voltage potential than the low-side conductor 122b. The motor drive 110 also includes an inverter 126 having three phase switches 128a, 128b, 128c, with each of the phase switches 128a, 128b, 128c configured to switch current from the DC bus 122a, 122b to supply AC power upon a corresponding output terminal 129a, 129b, 129c. The output terminals 129a, 129b, 129c are connected to corresponding ones of three output terminals 130, which deliver the alternating current (AC) power as three-phase AC power to three-phase motor 112. It should be appreciated that the motor drive 110 could include a different number of phases, such as one single phase, or more than three phases. For example, the motor drive 110 could include five or more of the phase switches 128a, 128b, 128c, each configured to switch current from the DC bus 122a, 122b to supply AC power upon a corresponding one of five or more output terminal 129a, 129b, 129c.

Each of the phase switches 128a, 128b, 128c within the inverter 126 of the motor drive 110 includes a high-side solid-state switch 134 configured to selectively conduct current between a corresponding one of the output terminals 129a, 129b, 129c and the high-side conductor 122a of the DC bus 122a, 122b. Each of the phase switches 128a, 128b, 128c also includes a low-side solid-state switch 136 configured to selectively conduct current between a corresponding one of the output terminals 129a, 129b, 129c and the low-side conductor 122b of the DC bus 122a, 122b.

A pulse-width modulation (PWM) waveform is used to fire these solid-state switches 134, 136 in a sequence that will generate the current waveform desired in the motor windings 114. The current waveform in the motor windings 114 is a byproduct of the voltage waveform generated by the solid-state switches 134, 136 of the inverter 126. In an electrical circuit one of the key parameters that determines the current is the resistance of the circuit. In a steady state circuit, the current can be determined by equation (1) below, where V is the voltage across the circuit, R is the resistance of the circuit and I is the current in the circuit.

$$V = I*R \tag{1}$$

In a given circuit the sum of current through any node must be equal to zero. In the case of a Wye wound motor each of the phases connect at a neutral node, and therefore the current in each of the phases must sum to zero. If the motor circuit is simplified to only include the resistance component, equation (1) can be combined with this information and used to derive equation (2).

$$I_A = \frac{\frac{V_A}{R_A} + \frac{V_B}{R_B} + \frac{V_C}{R_C}}{R_A\left(\frac{1}{R_A} + \frac{1}{R_B} + \frac{1}{R_C}\right)} \tag{2}$$

In equation (2), each of $V_A$, $V_B$, and $V_C$ represents the voltage of a corresponding output terminal 129a, 129b, 129c relative to ground. The subscript for these indicates the specific phase. The variables $R_A$, $R_B$, and $R_C$ each defines a corresponding resistance from each corresponding output terminal 129a, 129b, 129c to the neutral node. The variable $I_A$ represents the current through the A-phase, or the current supplied from the A-phase output terminal 129a to the A-phase winding Phase$_A$ of the motor 112. It becomes clear based on this equation that the current in each phase is dependent on the resistance in each phase and the voltage applied to that phase.

The path between the high-side conductor 122a of the DC bus 122a, 122b and each of the output terminals 129a, 129b, 129c may be referred to as a high-side leg of the corresponding one of the phase switches 128a, 128b, 128c. The path between the low-side conductor 122b of the DC bus 122a, 122b and each of the output terminals 129a, 129b, 129c may be referred to as a low-side leg of the corresponding one of the phase switches 128a, 128b, 128c.

To ensure that the current waveform generated by the inverter 126 is as desired, the current flowing through each of the low-side legs is determined by measuring the voltage across a shunt resistor 138 in series with the low-side solid-state switch 136 in each of the phase switches 128a, 128b, 128c. This measurement using the shunt 126 uses equation (1), and solves for I using a known R and measuring V. This measurement may be used as feedback for closed-loop control of motor current supplied to the motor 112. The placement of this shunt resistor 138 in the low-side leg of the phase switches 128a, 128b, 128c adds resistance to the low-side leg, as this resistance is needed to create voltage across the shunt resistor 138. This additional resistance means that the low side legs of the phase switches 128a, 128b, 128c will have higher resistance if all other components are balanced in terms of resistance. The voltage that is applied to each phase is determined by the duty cycles of the high-side solid-state switch 134 and the low-side solid-state switch 136. The percentage of time that the high-side solid-state switch 134 is on determines the percentage of the DC positive voltage that is applied to the corresponding output terminal 129a, 129b, 129c. One minus this percentage is then used to determine the percent time that the low-side solid-state switch 136 is on. The resistance contribution of the high and low side inverter legs is therefore based on the percent time that each solid-state switch 134, 136 is on, and the resistance in each respective portion of the phase switch 128a, 128b, 128c. Because this changing voltage changes the proportion of time that the high-side solid-state switch 134 and low-side solid-state switch 136 are in a conductive state, it will also change the resistance in the complete phase switch 128a, 128b, 128c. This changing resistance acts like a forcing function on the closed loop current control and effects the response of this control system, as the current regulator must now change the applied voltage to reach the same current.

Figure 3:
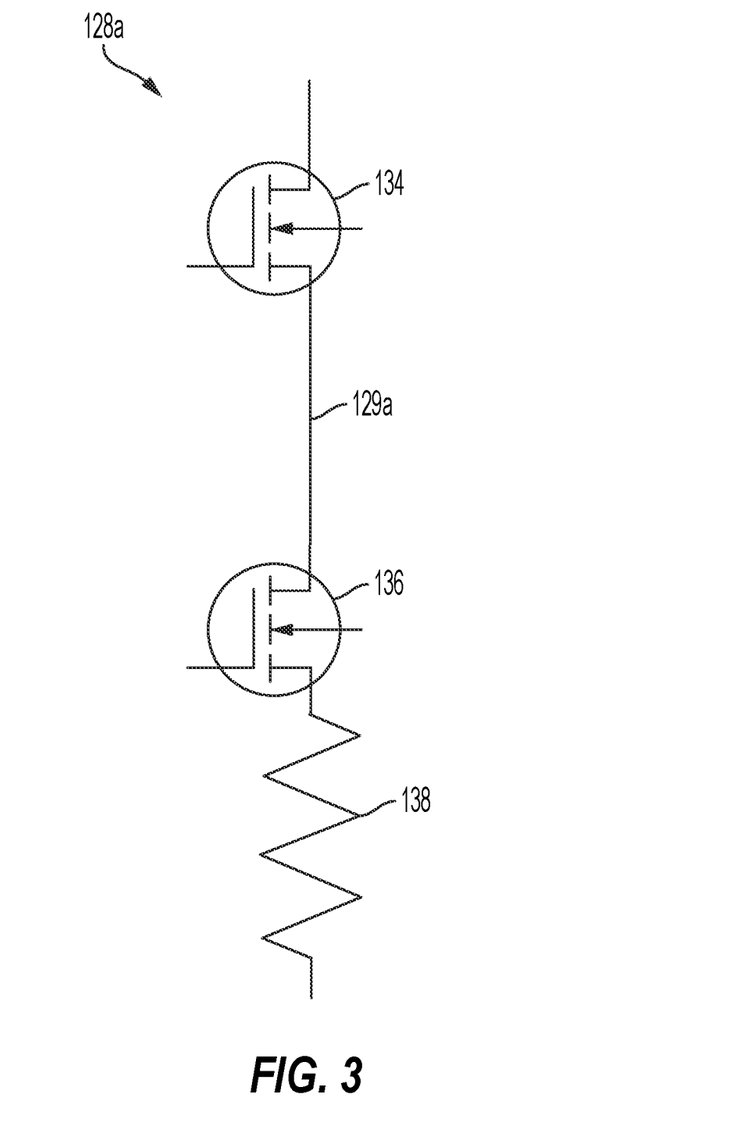
FIG. 3 generally illustrates a schematic diagram of a phase switch according to the principles of the present disclosure.

FIG. 3 shows an enlarged section of the schematic diagram of the of the motor drive 110 of FIG. 2, showing the A-phase phase switch 128a.

The balancing of the inverter circuit with a shunt resistor 138 in the low-side leg can be accomplished through the careful selection of components used to implement the high-side solid-state switches 134 and low-side solid-state switches 136. Those components may include, for example, different types of MOSFETs. To best balance the legs of this inverter, devices selected for the low-side solid-state switches 136 can have a resistance equal to the resistance of the high-side solid-state switch 134 minus the resistance of the shunt resistor 138, as shown below in equation (3). In Equation (3), the resistance of each component is denoted by R with a subscript describing the component. In this equation, $R_{Low}$ is the resistance of the low-side solid-state switch 136, $R_{High}$ is the resistance of the high-side solid-state switch 134 and $R_{Shunt}$ is the resistance of the shunt resistor 138 used for low-side current measurement.

$$R_{Low} = R_{High} - R_{Shunt} \tag{3}$$

For example, the high-side solid-state switch 134 of the phase switch 128a shown in FIG. 3 may have a conducting-state resistance with a nominal value of 1.9 mΩ (milliohms). The low-side leg of the phase switch 128a includes a series combination of the low-side solid-state switch 136 and the shunt resistor 138. The low-side solid-state switch 136 may have a conducting-state resistance with a nominal value of 1.4 mΩ (milliohms), and the shunt resistor 138 may have a resistance with a nominal value of 0.5 mΩ (milliohms). The series combination of the low-side solid-state switch 136 and the shunt resistor 138 have a combined nominal resistance of 1.9 mΩ (milliohms) with the low-side solid-state switch 136 in a conducting state. This provides the high-side leg and the low-side leg with equivalent or balanced nominal resistances. The actual resistance of the high-side solid-state switch 134, the low-side solid-state switch 136 and/or the shunt resistor 138 may vary from their respective nominal resistance values by some amount. The amount of deviation between actual resistance and the nominal resistance may be specified to be within a given tolerance amount for each of the high-side solid-state switch 134, the low-side solid-state switch 136 and/or the shunt resistor 138.

The high-side solid-state switch 134 and the low-side solid-state switch 136 may have a conducting-state resistance that is determined based, at least in part, on a nominal voltage of the DC source 120. The shunt resistor 138 may also have a resistance value that is determined based, at least in part, on the nominal voltage of the DC source 120. For example, the high-side solid-state switch 134 and the low-side solid-state switch 136 may each have a nominal conducting-state resistance value of less than 2.0 milliohms where the DC source 120 has a nominal voltage of twelve (12) volts. In another configuration, where the DC source 120 has a nominal voltage of forty-eight (48) volts, the high-side solid-state switch 134 and the low-side solid-state switch 136 may each have a nominal conducting-state resistance value of 4 to 8 milliohms, and the shunt resistor 138 may have a resistance value of 1 to 3 milliohms.

This technique may also be expanded to compensate for conductor resistances. Conductors in the circuit, such as traces that connect the components on a circuit board for the inverter 126 can also add additional resistance. In this case, the equation (3) may be expanded to equation (4), below.

$$R_{L\_FET} = R_{H\_FET} + R_{H\_Trace} - R_{L\_Trace} - R_{Shunt} \quad (4)$$

In this equation (4), the solid-state switch components are now represented by subscript "L_FET" and "H_FET" for the low-side solid-state switch 136, and the high-side solid-state switch 134, respectively. The variables "H_Trace" and "L_Trace" have been added to represent the high and low side traces respectively. The resistance of the shunt resistor 138 used for low side current measurement is represented by $R_{Shunt}$, same as in equation (3). Equation (4) demonstrates how the solid-state switch components may be selected in such a way to balance the low and high side legs and to reduce the forcing function imbalance introduces into the motor control system used to control operation of the solid-state switches 134, 136.

In one example embodiment, the high-side solid-state switch 134 has a conducting-state resistance with a nominal value of 1.9 mΩ (milliohms), the low-side solid-state switch 136 has a conducting-state resistance with a nominal value of 1.4 mΩ (milliohms), and the shunt resistor 138 has a resistance of 0.5 mΩ (milliohms). In another example embodiment, the high-side solid-state switch 134 has a conducting-state resistance with a nominal value of 1.0 mΩ (milliohms), and the low-side solid-state switch 136 has a conducting-state resistance with a nominal value of 0.64 mΩ (milliohms) and is connected in series with the shunt resistor 138. In another example embodiment, the high-side solid-state switch 134 has a conducting-state resistance with a nominal value of 1.2 mΩ (milliohms), and the low-side solid-state switch 136 has a conducting-state resistance with a nominal value of 1.0 mΩ (milliohms) and is connected in series with the shunt resistor 138.

In some embodiments, the high-side solid-state switch 134 and the low-side solid-state switch 136 may each have different physical packages. For example, the high-side solid-state switch 134 may include a package having a 5 m×6 mm size, and the low-side solid-state switch 136 may include a package having a 7 m×8 mm size. Either or both of the high-side solid-state switch 134 and/or the low-side solid-state switch 136 may include a surface-mount package, such as a package that conforms with standard MO-319A by the JEDEC Solid State Technology Association. In some embodiments, either or both of the high-side solid-state switch 134 and/or the low-side solid-state switch 136 may include a leadless package, such as a sTOLL type package by Infineon.

Additionally or alternatively, the shunt resistor 138 may be connected in series with the high-side solid-state switch 134. However, such arrangement may require different sensing hardware to measure current through the shunt resistor 138.

It is typical that the solid-state switch components in motor drives 110 for vehicular applications, such as those used in electric power steering (EPS) systems, are selected are to be the same part number. This design, in combination with shunts 138 for current measurement, naturally leads to imbalanced inverter leg resistances. The phase switch of the present disclosure corrects for this imbalance by intentionally selecting two different part types for the high-side solid-state switch 134 and the low-side solid state-switch 136, with the two different part types having different conducting-state resistance values. The conducting-state resistance values may each represent a resistance through a current carrying path and with the corresponding one of the solid-state switches 134, 136 in a conducting state. For example, for a solid-state switch that includes a field-effect transistor (FET), the conducting-state resistance may represent a drain-source resistance with the FET in the conducting state. The conducting state may also be called an 'ON' state. This ON-state drain-source resistance may be labeled $r_{ds\_on}$. The two different part types used for the high-side solid-state switch 134 and the low-side solid state-switch 136 may each be a same general type of MOSFET. However, different device types may be used. For example, one of the high-side solid-state switch 134 or the low-side solid state-switch 136 may be a particular type of MOSFET, and the other one of the high-side solid-state switch 134 or the low-side solid state-switch 136 may be a different type of field effect transistor (FET) or a different type of semiconductor device, such as a junction transistor. The conducting-state resistance values may be a resistance across the conducting path, such as a drain-source resistance, with the solid-state switch in a conducting state.

This configuration, with the high-side solid-state switch 134 and the low-side solid state-switch 136 having different conducting-state resistances, may improve the unique problems of low side current measurement by balancing the high-side and low-side legs. This configuration, with the high-side solid-state switch 134 and the low-side solid state-switch 136 having different conducting-state resistances, may also improve the response of the current regulator by eliminating a forcing function from the controlled system. This diversity of parts may also provide reduced system costs and improvements in thermal performance.

Typically, as the resistance of a solid-state switch decreases, the cost increases and the heat dissipation decreases. This inverse relationship means that if the system demands high current the cost of the solid-state switches increases. However, in some motor control strategies not all solid-state switches 134, 136 receive the same amount of current. In these cases, it is often true that the low side solid-state switches 136 spend longer times in the ON state. The balancing strategy of the present disclosure allows cost to only be added to the most effected solid-state switches. This strategy also allows the inverter 126 to incorporate solid-state switches 134, 136 having different price points, while maintaining the current carrying capability of the system.

The phase switch 128a, 128b, 128c of the present disclosure, including a high-side solid-state switch 134 and a low-side solid-state switch 136 with different conducting-state resistance values, may be used in numerous different applications. For example, the phase switch 128a, 128b, 128c may be used in a motor drive or in other inverter applications. The phase switches 128a, 128b, 128c of the present disclosure may be used, for motor drives for various different systems within a vehicle 10. For example, the phase switches 128a, 128b, 128c of the present disclosure may be used in a steering system of the vehicle 10, such as electric power steering (EPS) system, an advanced driver assistance system (ADAS) controlled steering, or a steer-by-wire (SbW) system. The phase switches 128a, 128b, 128c of the present disclosure may or may not include in-line current measurement systems (i.e. shunts 138)

The phase switch 128a, 128b, 128c of the present disclosure, including a high-side solid-state switch 134 and a low-side solid-state switch 136 with different conducting-state resistance values, may provide several advantages over traditional designs. Those advantages may include: 1. improved control characteristics and minimization of generated torque ripple; 2. improved thermal management capacity of the system by allowing lower resistance solid-state switches on the low side which operate longer in the conducting state; 3. provides 'within ECU' hardware diversity for process related failure management avoidance; and/ or 4. enables larger cost optimization based on part selection for the solid-state switches 134, 136.

The present disclosure provides an inverter comprising a phase switch configured to supply AC power via an output terminal, the phase switch including a high-side leg and a low-side leg, the high-side leg including a high-side solid-state switch configured to selectively conduct current between a high-side conductor of a DC bus and the output terminal, and the low-side leg including a low-side solid-state switch configured to selectively conduct current between the output terminal and a low-side conductor of the DC bus. The high-side solid-state switch has a first conducting-state resistance value, and the low-side solid-state switch has a second conducting-state resistance value different than the first conducting-state resistance value.

In some embodiments, at least one of the high-side leg or the low-side leg further includes a shunt resistor connected in series with a corresponding one of the high-side solid-state switch or the low-side solid-state switch.

In some embodiments, the series combination of the shunt resistor and the corresponding one of the high-side solid-state switch or the low-side solid-state switch has a combined series resistance approximately equal to the conducting-state resistance value of the other one of the high-side solid-state switch or the low-side solid-state switch to balance the resistances of the high-side leg and the low-side leg.

In some embodiments, the series combination of the shunt resistor and the corresponding one of the high-side solid-state switch or the low-side solid-state switch has a combined nominal series resistance equal to a nominal value of the conducting-state resistance of the other one of the high-side solid-state switch or the low-side solid-state switch to balance the nominal resistances of the high-side leg and the low-side leg.

In some embodiments, the shunt resistor is connected in series with the low-side solid-state switch.

In some embodiments, the shunt resistor is connected in series with the high-side solid-state switch.

In some embodiments, the high-side solid-state switch and the low-side solid-state switch each have a different physical package type.

In some embodiments, the high-side solid-state switch and the low-side solid-state switch each have a nominal conducting-state resistance value of less than 8.0 milliohms.

In some embodiments, the high-side solid-state switch and the low-side solid-state switch each have a nominal conducting-state resistance value of less than or equal to 2.0 milliohms.

In some embodiments, the high-side solid-state switch has a nominal conducting-state resistance value of 1.0 milliohms, and the low-side solid-state switch has a nominal conducting-state resistance value of 0.64 milliohms.

In some embodiments, the high-side solid-state switch has a nominal conducting-state resistance value of 1.2 milliohms, and the low-side solid-state switch has a nominal conducting-state resistance value of 1.0 milliohms.

In some embodiments, the high-side solid-state switch has a nominal conducting-state resistance value of 1.9 milliohms, the low-side solid-state switch has a nominal conducting-state resistance value of 1.4 milliohms, and the shunt resistor has a nominal resistance of 0.5 milliohms.

In some embodiments, the phase switch is one of a plurality of phase switches, and each of the phase switches is configured to supply AC power via a corresponding output terminal.

The present disclosure provides a motor drive comprising an inverter, the inverter including a plurality of phase switches, each of the phase switches configured to supply AC power to an electric motor via a corresponding output terminal, each of the phase switches including: a high-side leg and a low-side leg, the high-side leg including a high-side solid-state switch configured to selectively conduct current between a high-side conductor of a DC bus and the corresponding output terminal, and the low-side leg including a low-side solid-state switch configured to selectively conduct current between the corresponding output terminal and a low-side conductor of the DC bus. The high-side solid-state switch has a first conducting-state resistance value, and the low-side solid-state switch has a second conducting-state resistance value different than the first conducting-state resistance value.

In some embodiments, the plurality of phase switches includes at least three of the phase switches.

In some embodiments, the low-side leg further includes a shunt resistor connected in series with the low-side solid-state switch.

In some embodiments, at least one of the high-side leg or the low-side leg further includes a shunt resistor connected in series with a corresponding one of the high-side solid-state switch or the low-side solid-state switch, and the series combination of the shunt resistor and the corresponding one of the high-side solid-state switch or the low-side solid-state switch has a combined nominal series resistance equal to a nominal value of the conducting-state resistance of the other one of the high-side solid-state switch or the low-side solid-state switch to balance the nominal resistances of the high-side leg and the low-side leg.

In some embodiments, the high-side solid-state switch and the low-side solid-state switch each have a different physical package type.

In some embodiments, the high-side solid-state switch and the low-side solid-state switch each have a nominal conducting-state resistance value of less than 2.0 milliohms.

In some embodiments, an electric power steering system includes the motor drive of the present disclosure.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An inverter comprising:
a phase switch configured to supply AC power via an output terminal, the phase switch including a high-side leg and a low-side leg, the high-side leg including a high-side solid-state switch configured to selectively conduct current between a high-side conductor of a DC bus and the output terminal, and the low-side leg including a low-side solid-state switch configured to selectively conduct current between the output terminal and a low-side conductor of the DC bus,
wherein the high-side solid-state switch has a first conducting-state resistance value, and the low-side solid-state switch has a second conducting-state resistance value different than the first conducting-state resistance value,
wherein at least one of the high-side leg or the low-side leg further includes a shunt resistor connected in series with a corresponding one of the high-side solid-state switch or the low-side solid-state switch, and
wherein the series combination of the shunt resistor and the corresponding one of the high-side solid-state switch or the low-side solid-state switch has a combined series resistance approximately equal to the conducting-state resistance value of the other one of the high-side solid-state switch or the low-side solid-state switch to balance the resistances of the high-side leg and the low-side leg.

2. The inverter of claim 1, wherein the shunt resistor is connected in series with the low-side solid-state switch.

3. The inverter of claim 1, wherein the high-side solid-state switch and the low-side solid-state switch each have a different physical package type.

4. The inverter of claim 1, wherein the high-side solid-state switch and the low-side solid-state switch each have a nominal conducting-state resistance value of less than 8.0 milliohms.

5. The inverter of claim 1, wherein the high-side solid-state switch and the low-side solid-state switch each have a nominal conducting-state resistance value of less than or equal to 2.0 milliohms.

6. The inverter of claim 1, wherein the high-side solid-state switch has a nominal conducting-state resistance value of 1.0 milliohms, and the low-side solid-state switch has a nominal conducting-state resistance value of 0.64 milliohms.

7. The inverter of claim 1, wherein the high-side solid-state switch has a nominal conducting-state resistance value of 1.2 milliohms, and the low-side solid-state switch has a nominal conducting-state resistance value of 1.0 milliohms.

8. The inverter of claim 1, wherein the high-side solid-state switch has a nominal conducting-state resistance value of 1.9 milliohms, the low-side solid-state switch has a nominal conducting-state resistance value of 1.4 milliohms, and the shunt resistor has a nominal resistance of 0.5 milliohms.

9. The inverter of claim 1, wherein the phase switch is one of a plurality of phase switches, each of the phase switches configured to supply AC power via a corresponding output terminal.

10. An inverter comprising:
a phase switch configured to supply AC power via an output terminal, the phase switch including a high-side leg and a low-side leg, the high-side leg including a high-side solid-state switch configured to selectively conduct current between a high-side conductor of a DC bus and the output terminal, and the low-side leg including a low-side solid-state switch configured to selectively conduct current between the output terminal and a low-side conductor of the DC bus,
wherein the high-side solid-state switch has a first conducting-state resistance value, and the low-side solid-state switch has a second conducting-state resistance value different than the first conducting-state resistance value,
wherein at least one of the high-side leg or the low-side leg further includes a shunt resistor connected in series with a corresponding one of the high-side solid-state switch or the low-side solid-state switch, and
wherein the series combination of the shunt resistor and the corresponding one of the high-side solid-state switch or the low-side solid-state switch has a combined nominal series resistance equal to a nominal value of the conducting-state resistance of the other one of the high-side solid-state switch or the low-side solid-state switch to balance the nominal resistances of the high-side leg and the low-side leg.

11. The inverter of claim 10, wherein the shunt resistor is connected in series with the low-side solid-state switch.

12. The inverter of claim 10, wherein the high-side solid-state switch and the low-side solid-state switch each have a different physical package type.

13. The inverter of claim 10, wherein the high-side solid-state switch and the low-side solid-state switch each have a nominal conducting-state resistance value of less than 8.0 milliohms.

14. The inverter of claim 10, wherein the high-side solid-state switch and the low-side solid-state switch each have a nominal conducting-state resistance value of less than or equal to 2.0 milliohms.

15. A motor drive comprising:
an inverter including a plurality of phase switches, each of the phase switches configured to supply AC power to an electric motor via a corresponding output terminal, each of the phase switches including: a high-side leg and a low-side leg, the high-side leg including a high-side solid-state switch configured to selectively conduct current between a high-side conductor of a DC bus and the corresponding output terminal, and the low-side leg including a low-side solid-state switch configured to selectively conduct current between the corresponding output terminal and a low-side conductor of the DC bus, wherein the high-side solid-state switch has a first conducting-state resistance value, and the low-side solid-state switch has a second conducting-state resistance value different than the first conducting-state resistance value, wherein at least one of the high-side leg or the low-side leg further includes a shunt resistor connected in series with a corresponding one of the high-side solid-state switch or the low-side solid-state switch, and wherein the series combination of the shunt resistor and the corresponding one of the high-side solid-state switch or the low-side solid-state switch has a combined nominal series resistance equal to a nominal value of the conducting-state resistance of the other one of the high-side solid-state switch or the low-side solid-state switch to balance the nominal resistances of the high-side leg and the low-side leg.

16. The motor drive of claim 15, wherein the plurality of phase switches includes at least three of the phase switches.

17. The motor drive of claim 15, wherein the low-side leg further includes a shunt resistor connected in series with the low-side solid-state switch.

18. The motor drive of claim 15, wherein the high-side solid-state switch and the low-side solid-state switch each have a different physical package type.

19. The motor drive of claim 15, wherein the high-side solid-state switch and the low-side solid-state switch each have a nominal conducting-state resistance value of less than 2.0 milliohms.

20. An electric power steering system comprising the motor drive of claim 15.

* * * * *